United States Patent [19]

Dakin

[11] Patent Number: 4,914,288
[45] Date of Patent: Apr. 3, 1990

[54] OPTICAL SENSING SYSTEM WITH AVERAGING CIRCUIT

[75] Inventor: John P. Dakin, Hampshire, Great Britain

[73] Assignee: Plessy Overseas Limited, Ilford, Great Britain

[21] Appl. No.: 229,890

[22] PCT Filed: Dec. 11, 1987

[86] PCT No.: PCT/GB87/00898
§ 371 Date: Oct. 11, 1988
§ 102(e) Date: Oct. 11, 1988

[87] PCT Pub. No.: WO88/04407
PCT Pub. Date: Jun. 16, 1988

[30] Foreign Application Priority Data

Dec. 11, 1986 [GB] United Kingdom ............... 8629635

[51] Int. Cl.⁴ ............................................. G01N 21/00
[52] U.S. Cl. ............................. 250/227.11; 356/73.1; 356/301; 330/4.3; 250/214 A
[58] Field of Search ............... 250/231 R, 231 P, 227, 250/214 R; 356/73.1; 73/705, 800; 374/161; 377/60, 62

[56] References Cited

U.S. PATENT DOCUMENTS

| 4,123,160 | 10/1978 | Caputo et al. | 356/75 |
| 4,236,904 | 12/1980 | Lazay | 356/73.1 |
| 4,399,458 | 8/1983 | Berry et al. | 377/62 |
| 4,713,538 | 12/1987 | Theocharous | 250/231 R |

FOREIGN PATENT DOCUMENTS

| 0122953 | 10/1984 | European Pat. Off. | 356/73.1 |
| 0149034 | 11/1980 | Japan | 356/73.1 |
| 0079938 | 6/1981 | Japan | 356/73.1 |
| 59-0013913A | 1/1984 | Japan . | |
| 2033078A | 5/1980 | United Kingdom | 356/73.1 |

OTHER PUBLICATIONS

Murphy et al., "An Attenuation Monitor for Use in Optical Cable Field Trials", *Int. Wire & Cable Symposium Proc.*, 11/81, pp. 396–405.

Shibata et al., "Measurements of Waveguide Structure Fluctuation in a Multimode Optical Fiber by Backscattering Technique", *IEEE Jour. of Quantum El.*, 1/81, pp. 39–44.

Hillerich, "On Site Location of Optical Fiber Defects and Eval. of Transmission Loss", *Int. Wire & Cable Symposium Proc.*, 11/77, pp. 373–379.

Michaels, "Time-Domain Reflectometers Tackle Fiber-Optic Cabling", *Electronics Design*, vol. 34, No. 18, 8/86, pp. 59, 60, 62.

Primary Examiner—David C. Nelms
Assistant Examiner—Michael Messinger
Attorney, Agent, or Firm—Fleit, Jacobson, Cohn, Price, Holman & Stern

[57] ABSTRACT

A multi channel averaging circuit for use with an optical sensing system utilizing back-scattering light for establishing the scattering profile along a fiber sensor, e.g. to determine the temperature distribution along the optical fiber sensor. The circuit comprises a number of connected in parallel, charge coupled devices (3–9) energized by a clock (10) and arranged to store successive elements of a signal waveform derived from the back-scattered light. The stored analogue signals are fed sequentially into the averaging circuit (11), sampled, and then digitized by an A to D converter (13).

4 Claims, 1 Drawing Sheet

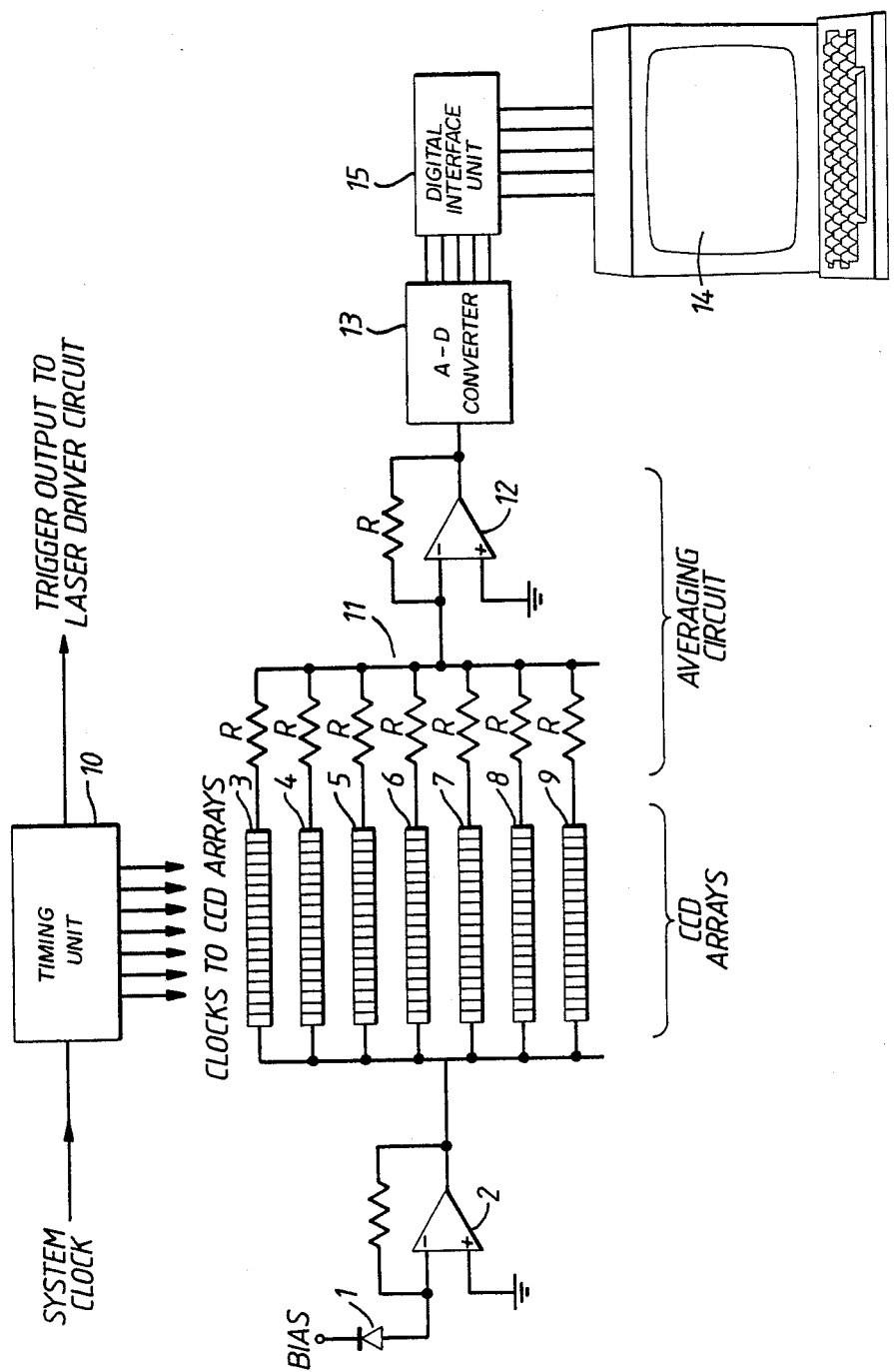

OPTICAL SENSING SYSTEM WITH AVERAGING CIRCUIT

This invention relates to optical sensing systems of the kind in which successive optical pulse signals of a particular wavelength are transmitted along an optical fibre sensor which extends over a path the temperature profile or some other profile (e.g. loss profile or pressure profile) of which is required to be monitored. Time-related back-scattered light resulting from the pulses propagating along the fibre sensor may be detected and measured by means of an optical time domain reflectometer which accordingly provides an indication of the temperature distribution along the fibre sensor.

The utilization of back-scattered light for determining the profile of a physical parameter causing variations in the scattering of light along the fibre sensor enables optical fibres to be monitored either to check their basic transmission characteristics or, alternatively, to monitor external physical parameters, such as temperature, along the fibre.

However, the back-scattered returned signals along the fibre sensor are generally relatively weak. Consequently, a high degree of signal averaging of the return signals in response to successive optical pulses propagating along the fibre sensor is required in order to establish an accurate scattering distribution measurement.

The present invention is directed therefore to a fast multi-channel averaging circuit arrangement which enables the back-scattered return signals from a large number of points along the optical fibre sensor to be stored as each of the successive optical pulse signals propagates along the fibre and which facilitates the subsequent averaging of all the return signal stored data to provide an accurate measurement of the scattering profile along the fibre sensor.

According to the present invention there is provided a multi-channel averaging circuit arrangement, especially for use with optical sensing systems of the kind described above utilizing back-scattered light return signals for establishing the scattering profile along a fibre sensor, in which the circuit arrangement comprises a plurality of charge-coupled-device arrays each consisting of a multiplicity of devices capable of storing all the successive elements of a signal waveform (e.g. corresponding to the return optical signal of back-scattered light in an optical sensing system), in which the charge-coupled-device arrays are arranged to be rendered operative sequentially for storing successive incoming signal waveforms under the control of timing means and in which, following the storage of a predetermined number of signal waveforms in the respective charge-coupled-device arrays, the groups of signal waveform elements data stored in devices of the charge-coupled-device arrays are fed sequentially into an averaging circuit, preferably including resistor/amplifier means and in which the averaged groups of signal elements are preferably fed into an analogue-to-digital converter, prior to being fed into a processor for providing an indication of the averaged signal waveforms in respect of the successive incoming signal waveforms to the circuit arrangement.

In carrying out the present invention for the averaging of the returning optical signal waveforms from an optical fibre sensor in optical sensing systems in response to the succession of optical pulses propagating along the fibre, the returning optical signals may be applied to an avalanche photodetector for converting the returning optical signals into electrical signals and these electrical signals may then be amplified before being fed to the charge-coupled-device arrays sequentially under the control of clock means which also controls the triggering of a laser which produces the successive light pulse signals for propagating along the fibre sensor.

BRIEF DESCRIPTION OF THE DRAWING

The FIGURE shows a circuit arrangement according to the invention.

By way of example the present invention will now be described with reference to the SINGLE-FIGURE accompanying drawing which shows a signal waveform averaging circuit arrangement eminently suitable for use with an optical sensing system utilising Raman back-scattered light from a pulsed optical fibre sensor to determine the temperature distribution along the fibre sensor. The level of Raman back-scattered light from a fibre is particularly weak yet particularly useful for temperature measurement.

Referring to the drawing, the returning Raman back-scattered light signal waveform arriving at the launch end of the optical fibre sensor in response to the propagation of a laser light pulse along the fibre sensor may be applied to a suitably biased avalanche photodetector 1. The light signal waveform may correspond to the temperature profile along the optical fibre sensor, since the intensity of the Raman back-scattered light signal at points in the waveform will vary consistently in dependence upon the distribution of temperature along the fibre sensor. Accordingly, the photodiode 1 will produce an electrical signal waveform in respect of each pulse propagating along the fibre sensor. As regards the arrangement and the operation of such an optical sensing system reference may be made to our co-pending British patent application No. 2140554A.

Since the returned Raman back-scattered light signal waveform tends to be relatively weak it is usually necessary to average successive return signal waveforms in order to achieve an accurate evaluation of the true signal levels at different points in the signal waveform. In order to achieve this averaging the successive electrical signal waveforms produced by the photodiode 1 in response to successive optical pulses propagating along the fibre sensor will, after amplification by amplifier means 2, be fed sequentially into charge-coupled-device arrays 3 to 9 each of which comprises a like multiplicity of charge-coupled-devices for storing data appertaining to the magnitude of signal elements of the signal waveform to be stored therein, the sequential operation of the array being under the control of a timing unit 10 which is itself clock-controlled and which renders the charge-coupled-device arrays operative sequentially in synchronization with the triggering of the laser for producing light pulses for propagation along the fibre sensor.

Thus, in the example shown, after the arrival of seven return signal waveforms at the photodiode 1, data corresponding to each of the seven return signal waveforms will be separately stored in each of the charge-coupled-device arrays 3 to 9, respectively. At any convenient time thereafter the charge-coupled-device arrays may be operated to cause the analogue data stored therein to be clocked-out synchronously in parallel from all of the device arrays so that the corresponding signal waveform elements stored in the respective arrays are effectively added and averaged by the averaging circuit 11 consisting of a network of resistors R and an amplifier 12 and then sampled and converted to a digital signal by an analogue-to-digital converter 13. It may here be mentioned that the clocking out of the data from the charge-coupled-device arrays is carried out at a much lower speed that the clocking in. This allows a relatively slow micro-computer 14, such as for example the so-called commercially available BBC B-micro computer to handle the information clocking-out rate through a suitable digital interface unit 15. This microcomputer will thus display the averaged electrical signal waveform generated by the avalanche photodiode 1 which waveform corresponds to the average return light wave signal arriving at the photodiode and representing the temperature distribution along the optical fibre sensor of the sensing system.

By use of many parallel charge-coupled-device arrays the signal processing rates are greatly reduced and in addition the effects of small device-to-device variations in the arrays are minimised, particularly if the location of the storage of data within each charge-coupled-device may be arranged to be different, since this will reduce any systematic production variation within the devices.

I claim:

1. A multi-channel signal averaging circuit arrangement as for use with optical sensing systems utilizing back-scattered light return signals for establishing the scattering profile along a fibre sensor, in which the circuit arrangement comprises a plurality of charge-coupled-device arrays each consisting of a multiplicity of devices capable of storing all the successive elements of a signal waveform (e.g. corresponding to the return optical signal of back-scattered light in an optical sensing system), in which the charge-coupled-device arrays are arranged to be rendered operative sequentially for storing successive incoming signal waveforms under the control of timing means and in which, following the storage of a predetermined number of signal waveforms in the respective charge-coupled-device arrays, groups of signal waveform elements data stored in devices of the charge-coupled device arrays are fed sequentially under the control of clock pulses from said timing means into an averaging circuit arrangement prior to being fed into a processor for providing an indication of the averaged signal waveforms in respect of the successive incoming signal waveforms to the circuit arrangement.

2. A multi-channel signal averaging circuit arrangement as claimed in claim 1, in which the averaging circuit comprises a network of resistors and amplifier means.

3. A multi-channel signal averaging circuit arrangement as claimed in claim 1, in which the averaged groups of signal elements are clocked out of the charge-coupled-device arrays in response to the clock pulses from the timing means are fed into an analogue-to-digital converter before being fed into the processor.

4. In an optical sensing system a multi-channel signal averaging circuit arrangement as claimed in claim 3, in which the averaging circuit arrangement averages the returning optical signal waveforms from an optical fibre sensor of said system in response to the succession of optical pulses propagating along the fibre, the returning optical signals being applied to an avalanche photodetector for converting the returning optical signals into electrical signals which are amplified before being fed to the charge-coupled-device arrays sequentially under the control of the timing means which also controls the triggering of a laser which produces the successive light pulse signals for propagating along the fibre sensor.

* * * * *